Sept. 11, 1962 E. J. HARRIS 3,052,920
VULCANIZING PRESS
Filed Oct. 6, 1958 10 Sheets-Sheet 1

FIG. 1

INVENTOR.
EDWARD J. HARRIS
BY
ATTORNEY

FIG. 2

INVENTOR
EDWARD J. HARRIS
BY
J. William Freeman
ATTORNEY

Sept. 11, 1962 E. J. HARRIS 3,052,920
VULCANIZING PRESS
Filed Oct. 6, 1958 10 Sheets-Sheet 4

FIG. 4

INVENTOR.
EDWARD J. HARRIS
BY
G. William Freeman
ATTORNEY

Sept. 11, 1962

E. J. HARRIS 3,052,920

VULCANIZING PRESS

Filed Oct. 6, 1958

INVENTOR.
EDWARD J. HARRIS
BY

ATTORNEY

FIG. 10

INVENTOR
EDWARD J. HARRIS
BY J. William Freeman
ATTORNEY

Sept. 11, 1962   E. J. HARRIS   3,052,920
VULCANIZING PRESS
Filed Oct. 6, 1958   10 Sheets-Sheet 10

INVENTOR.
EDWARD J. HARRIS
BY
ATTORNEY ered Sept. 11, 1962

3,052,920
VULCANIZING PRESS
Edward J. Harris, 590 Delaware Ave., Akron, Ohio
Filed Oct. 6, 1958, Ser. No. 765,386
10 Claims. (Cl. 18—17)

This invention relates to the art of vulcanizing presses and in particular has reference to improvements in vulcanizing presses wherein an automatic former is automatically positioned and withdrawn from the interior of a tire after vulcanization thereof.

In the known prior art of vulcanizing pneumatic tires, it has long been known that a pneumatic former can be automatically positioned interiorly of any drum built tire carcass to effectuate forming of the same followed by vulcanization thereof. Representative patents showing this principle of vulcanizing are Soderquist U.S. Patents 2,495,663 and 2,495,664. In the aforementioned patents, it will be noted that the pneumatic former is carried by the lower mold section, so as to be positioned between the mold sections when the relatively movable upper mold section moves into and out of closing contact with the lower mold section. It will also be noted that in regard to the above-mentioned patents, the same are of a general type of operating structure wherein the operating power for effectuating relative movement between upper and lower mold sections is achieved by the use of a bull ring type of drive wherein a link arm is pinned to an eccentric point on the large diameter bull ring so that upon rotation of the bull ring, the link member will move in such fashion as to move the upper mold section away from and towards the lower mold section.

While the above-mentioned type of operation has achieved a certain degree of commercial success, the same has never-the-less been possessed of certain inherent disadvantages.

First and foremost in this regard, is the fact that the pneumatic former projects above the cavity of the lower mold section so that the operator of the press is always faced with the difficulty of lifting the uncured tire over the projecting former and then dropping the same in place therearound to effectuate preliminary positioning thereof. Also in this regard, it is believed manifest that a lifting operation must be conducted when the cured tire is removed from the mold section. As a result of this arrangement, it has been necessary in the prior art to provide costly types of conveyor or other tire loading and unloading apparatus in association with the vulcanizing press so that the tires may be properly lifted over the projecting pneumatic former.

Also in this regard, the prior art teachings have gone to great extents to provide a tilting action of the upper mold section during movement thereof so that access may be had to the projecting former, with a minimal amount of vertical movement of the upper mold section.

Additionally, because of the fact that the former mechanism is carried by the lower mold section, it is obvious that the conventional cylinder actuating the same must be disposed beneath the former. Consequently, to dispose the former at even the waist of the operator, it is necessary to bury the foundation and actuating cylinder in the floor and in some cases the foundation for the press is set as much as four feet beneath floor level. Notwithstanding such expense of installation, the operator is still forced to lift the tire over the former in said presses.

In addition to the aforementioned disadvantages, the prior art presses of the type herein being discussed are further subject to the disadvantage that the overall height of the same is relatively great due to the fact that the bull ring type of arrangement necessarily requires a considerable degree of vertical clearance to permit operation of the bull ring member.

In applicant's co-pending application No. 690,675, filed October 17, 1957, by Adolf H. Frohlich and Edward J. Harris, and now U.S. Patent 2,970,342 there was provided a vulcanizing press that obviated certain of the disadvantages above discussed. More specifically, this vulcanizing press featured the use of an axially expandable pneumatic former that was carried by the relatively movable upper mold section for projection therefrom. Also, this projecting former had its extreme projecting end equipped with an adapter fitting that coacted with a complemental fitting on the lower mold section, so that upon closure of the press, vulcanizing medium could be supplied to the interior of the pneumatic former from a source carried by the lower mold section. Similarly, in this regard, condensate removal means were provided on the press, wherein condensate could be removed during closure of the press.

While the aforementioned press of the above-discussed co-pending application has been satisfactory in several respects, it has been found that the same is more or less possessed of certain disadvantages. For example, while a male and a female type of coupling connection was made between the lower mold section and the projecting end of the pneumatic former that was carried by the upper mold section, it was found that this connection would often times be disengaged during shaping of the tire due to the tendency of the tire to axially collapse and shift the former during radial expansion of the tire. Such axial collapse often exerts a retracting force on the projecting axial end of the former, with the result that the same would often times become disassociated with the supply conduit so as to obviate proper supply functioning. Attempts to eliminate the above by employing greater pressure to retain the head edge of the former more firmly in place have not met with entire satisfaction, since in these instances, it has been found that the tire will creep or move relatively of the former so that the steam will escape during curing. Such improper curing results primarily from the fact that air pockets will be created during movement of the tire with respect to the former during the shaping operation.

It has been discovered that all of the aforementioned difficulties can be eliminated if the projecting end of the pneumatic former is provided with a spring loaded fluid coupling that will be capable of moving axially of the former so as to permit shifting of the former during shaping, while still maintaining a fluid type connection between the interior of the former and the supply fitting of the lower mold section. More specifically, if the supply connection of the projecting end is spring loaded so as to be normally urged to a condition of maximum projection beyond the former, it has been found that the shifting of the former during the shaping operation will not result in breaking of the connection in the supply line.

While the above improvement has greatly enhanced the operation of the vulcanizing press of the above referred to co-pending application, it has been found that still further advantage results from the fact that the former per se is permitted to "float" with respect to the tire during shaping thereof and in this manner, the tire can creep or otherwise move relatively of the former during shaping so that when final shaping has occurred, a complete surface contact will be obtained between the internal surface of the tire and the exterior surface of the former to thus eliminate air pockets being formed.

In addition to the aforementioned disadvantages, it has also been discovered that the overall height of the vulcanizing press can be materially reduced by replacing the conventional bull ring gear with a crank arm that operates off of a central drive shaft, with the usual link arm that connects the bull ring with the upper mold section being replaced by a link arm that is pivotally connected between the outboard end of the crank arm of the upper mold section. In this regard, it has been found that the relocation of the shaft arm and the crank arm movement permits utilization of the central portion of the lower housing for the purpose of receiving the lower mold section, with the result that the space normally occupied by such a mechanism can be utilized as gear space so as to, in effect, reduce the overall height of the press.

Provision of a vulcanizing press having the above advantages over the prior art accordingly becomes the principal object of this invention, with other objects becoming more apparent upon a reading of the following brief specification, considered and interpreted in the light of the accompanying drawings.

Of the drawings:

FIGURE 3 is a view taken on the lines 3, 3 of FIGURE 2, with FIGURE 3a being an enlarged view showing in greater detail, the connection between the former and the supply system of the lower mold section.

Figures 5, 11:
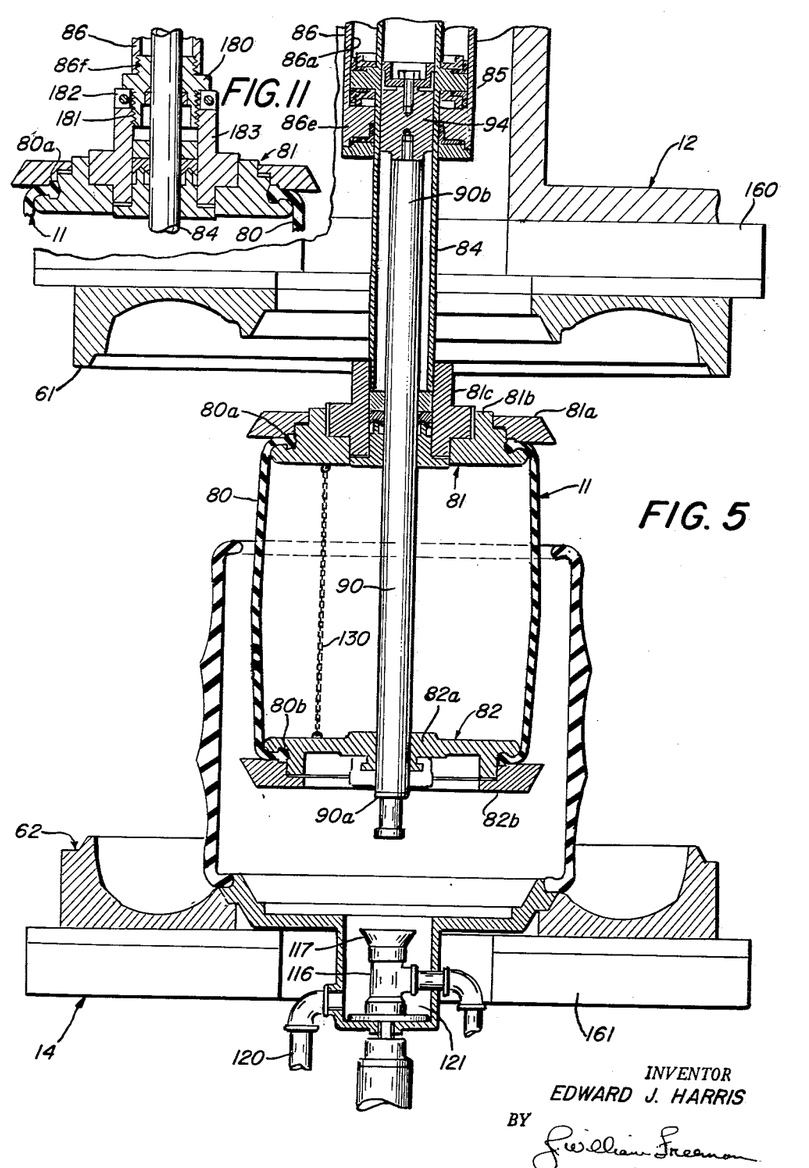
FIGURE 11 is a partial view of a modified type of former supporting mechanism.
Figure 6:
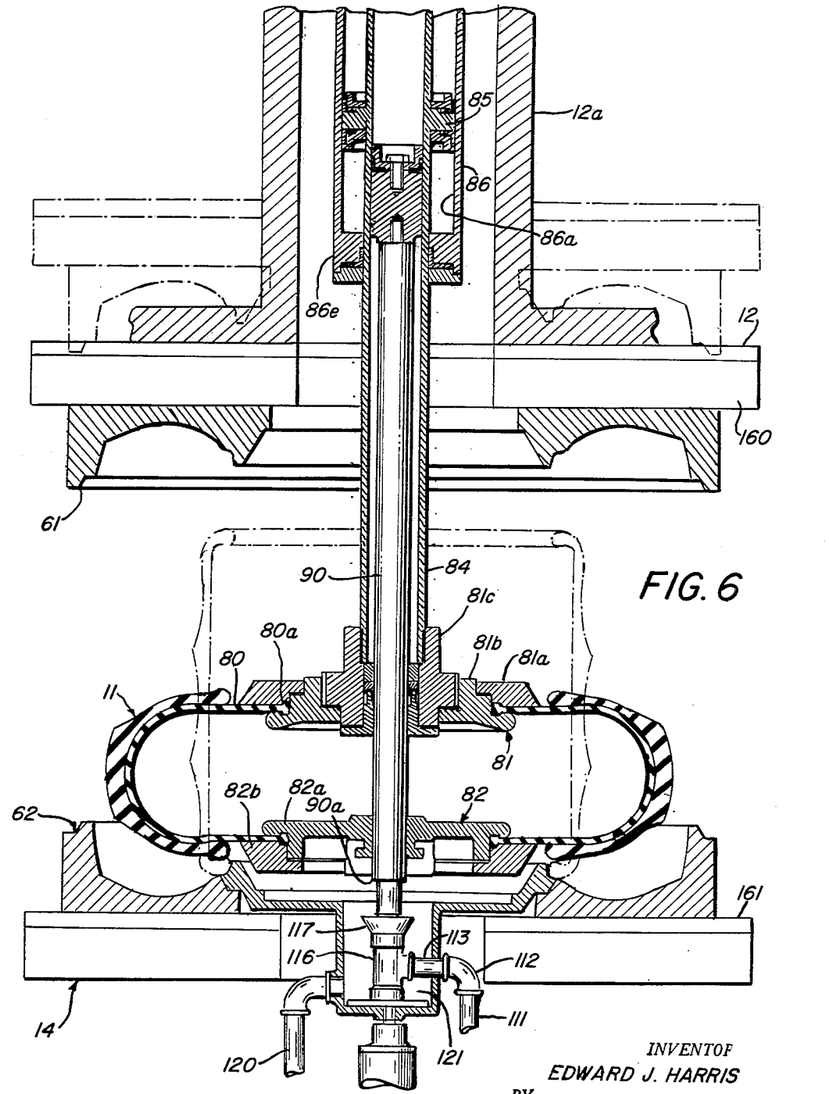
Figure 7:
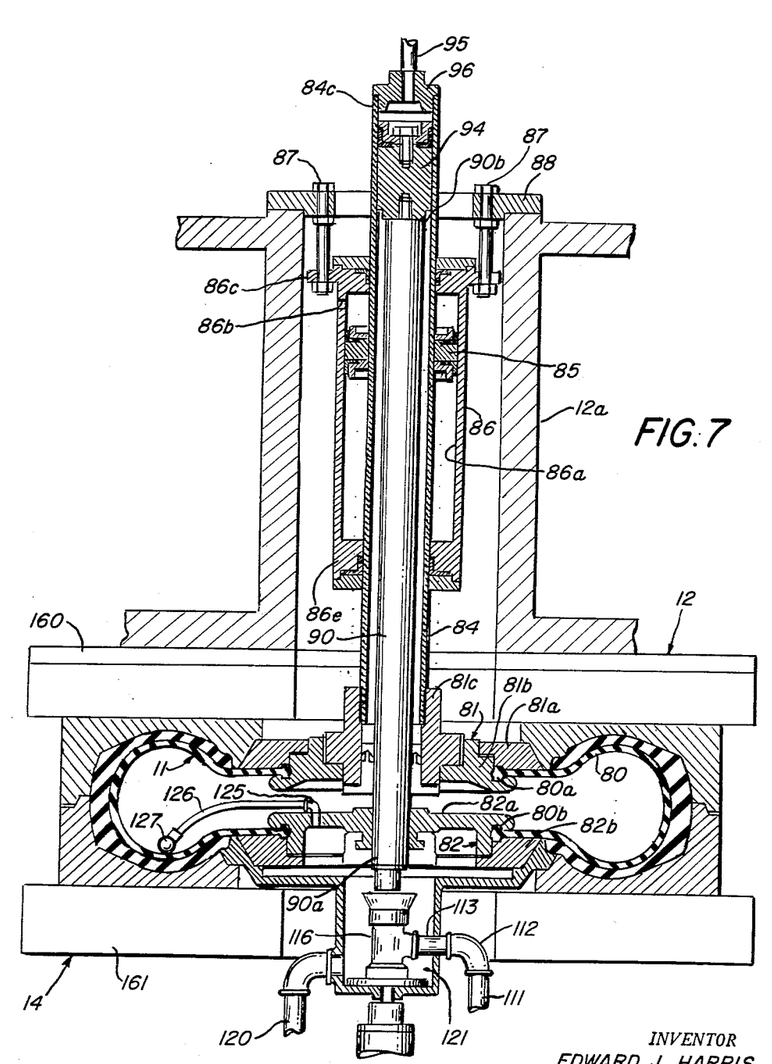
Figure 8:
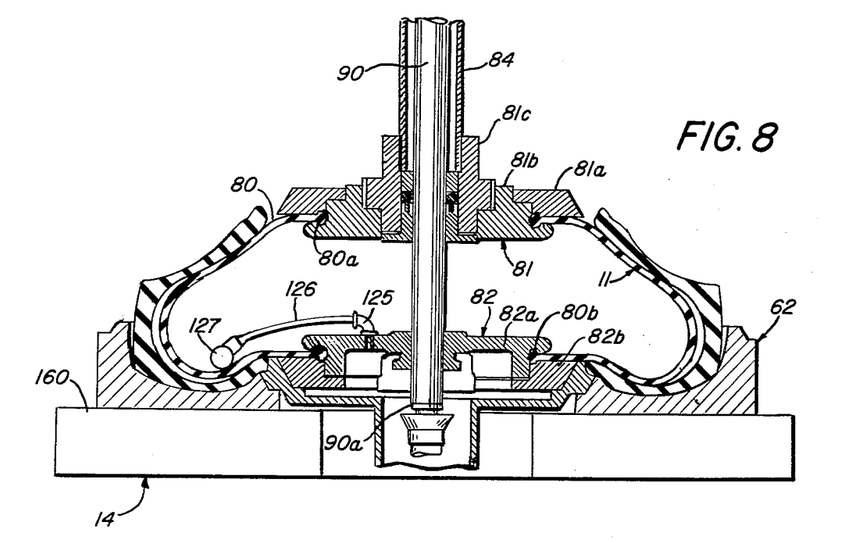

Referring now to the drawings and in particular to FIGURES 1 through 9 thereof, it will be seen that the improved vulcanizing press, generally designated by the numeral 10, includes a pneumatic former 11 that is shiftably carried by an upper mold section 12 so as to be capable of insertion and withdrawal with respect to a tire T that is supported on a bead ejector mechanism 13 of a lower mold section 14; the arrangement being such that the tire T will be deformed to the toroidal shape of FIGURES 6 through 9 inclusive by the former 11 upon closure of the mold sections 12 and 14 to the position of FIGURE 7.

In view of the relative complexity of the major component parts, the same will be individually described, with attention being given first to the construction of the operating mechanism for the press per se followed by a description of the former mechanism and operation of the device.

*The Press Operation Mechanism*

Figure 1:
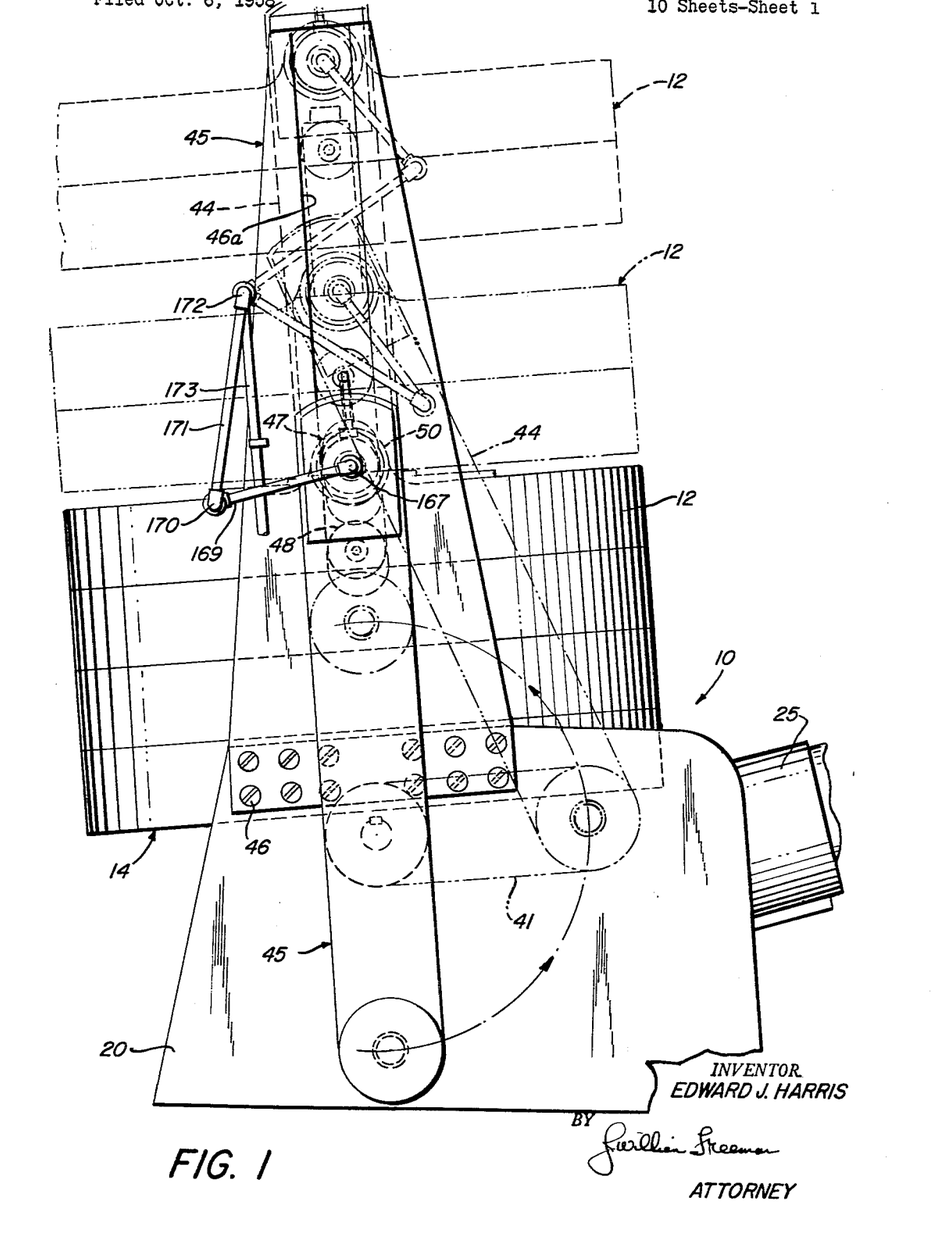
FIGURE 1 is a side elevation of the improved vulcanizing press, with the position of the upper mold section being shown in full, dotted and chain dotted lines representative of various conditions of operation.
Figure 2:
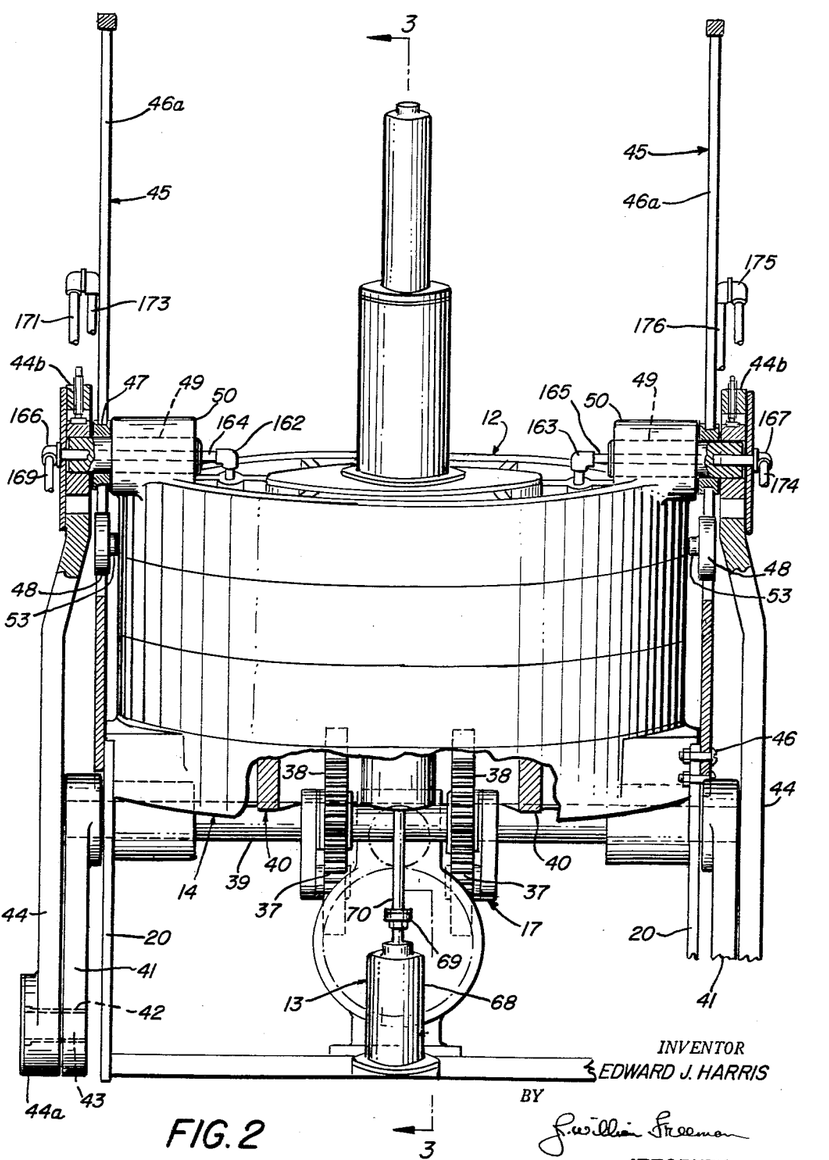
FIGURE 2 is a front view of the improved vulcanizing press.
Figures 3, 3A:
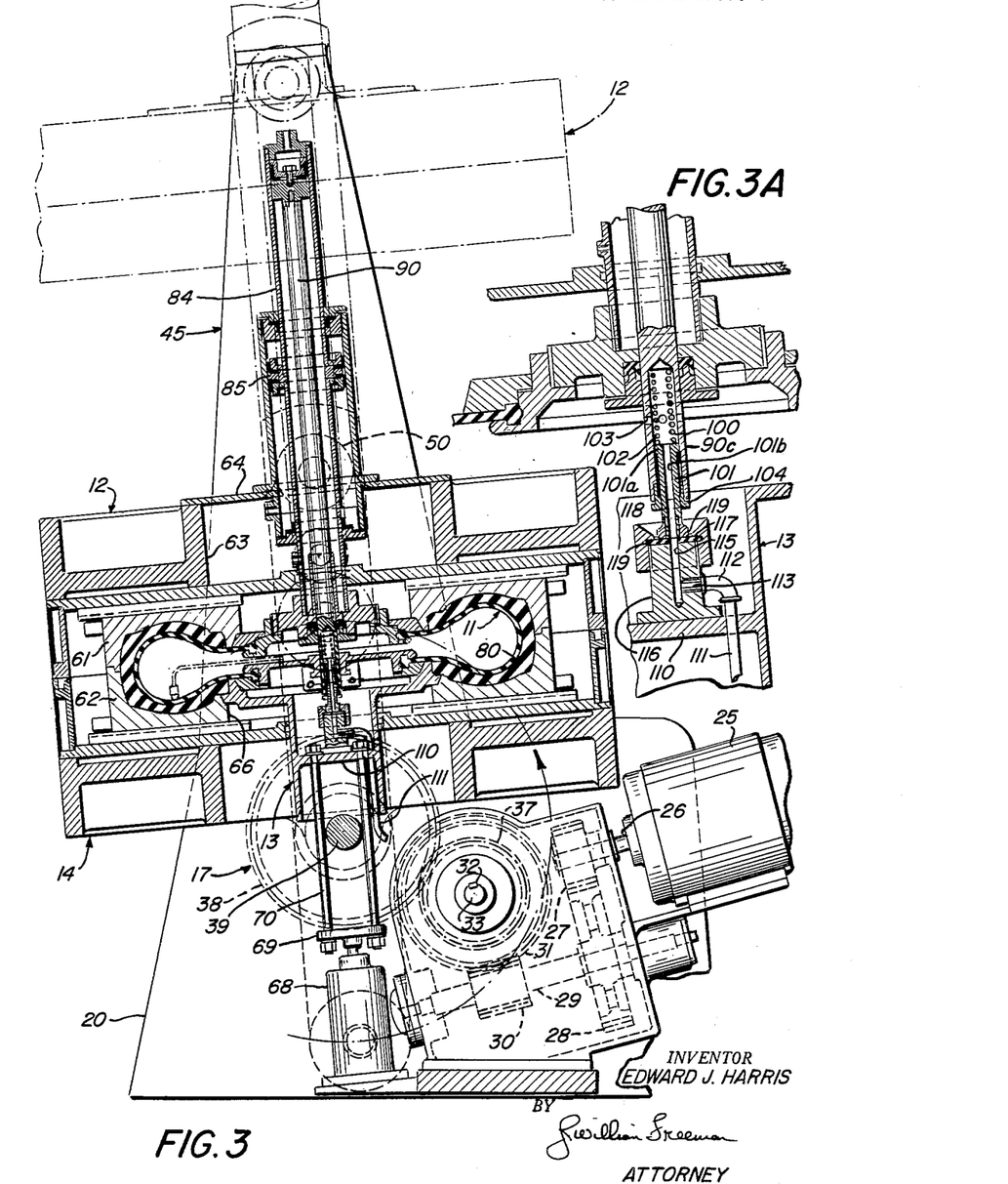

Referring first to FIGURES 1 through 3 inclusive for a detailed consideration of the press operating structure, it will be seen that the press per se is defined by a pair of opposed side plates 20, 20 that extend vertically in spaced relationship with each other so as to permit reception of the lower mold section 14 therebetween as is clearly shown in FIGURE 2 of the drawings, with adequate space being provided beneath the lower mold section 14 for installation of gearing mechanism 17, as will now be described.

To this end and as best shown in FIGURE 3, the gearing mechanism includes a motorized gear reduction member 25 having an output spindle 26 to which is secured a spur gear 27, with spur gear 27 meshing with larger diameter spur gear 28 that is received about shaft member 29. Received in axially spaced relationship on the shaft 29 is a worm gear 30 that, in turn, drives a spur gear 31 that is keyed, as at 32, to a shaft member 33 that extends between the upright plates 20, 20. Also keyed to the shaft member 36 at axially spaced points are a pair of spur gears 37, 37 that mesh with a pair of spur gears 38, 38 that are, in turn, keyed to shaft 39, with shaft 39 being journalled in bosses 40, 40 that depend from lower mold section 14 (see FIGURE 2). In this regard, the respective outboard ends of the shaft 39 are keyed to opposed crank arms 41, 41, with these crank arms having their free ends apertured as at 42 so as to receive a pin member 43 about which end 44a, 44a of link arms 44, 44 can be received.

For the purpose of guiding movement of upper mold section 12, the opposed plates 20, 20 are each shown having upright plate-like extensions 45, 45 provided thereon, with bolts 46, 46 preferably being employed to secure the upright members 45 in abutted, overlapped relationship with plates 20, 20, as shown in FIGURE 2 of the drawings. Additionally, each upright member 45 includes a slot 46, with this slot 46 being vertically elongate in extent so as to facilitate reception of roller members 47 and 48. In this regard, each roller 47 is journalled around a pin 49 that is, in turn, pivotally connected to the upper end 44b of each link arm 44. The opposite axial end of the pin 49 is shown journalled in bosses 50, 50 that are provided on the upper mold section 12, while each lower of the two roller members 48 is shown received about a shaft 53 that projects from the upper mold section 12 so as to at all times maintain a condition of parallelism between the mold sections 12 and 14.

In addition to the aforementioned component parts, the upper mold section 12 further includes a design-imparting upper mold half 61, while a similar design-imparting mold half 62 is shown carried by the lower mold section 14, with the usual vulcanizing steam chambers being provided in this regard, as will be described later. In this regard, it suffices to say that the central annular opening 63 of upper mold section 12 is spanned by a cover plate 64, with this cover plate 64 being apertured to receive the piston mechanism that extends and retracts the former 11, as will be described. Similarly, the lower mold section 12 is centrally apertured as at 66 to receive a bead ejector mechanism 13 that is projectable beyond the lower mold section 14 upon operation of a piston member 68. In this regard, the piston member 68 includes a head 69 that has a pair of draw bolts 70, 70 that connect to a component part of the bead ejector mechanism, as shown best in FIGURE 3. In this manner, the draw bolts 70, 70 are disposed on opposite sides of the shaft 39 so that operation of the bead ejector mechanism is not precluded by the shaft member 39.

*The Pneumatic Former Mechanism*

As has been previously indicated, the pneumatic former 11 coacts with and is movable relatively of the bead ejector mechanism 13 and is additionally movable relatively of both the upper and lower mold sections 12 and 14 respectively.

Accordingly, the former 11 is shown including a resilient tubular sleeve 80 having its axially opposed beaded ends 80a and 80b respectively connected to axially spaced clamping members that are designated generally by the numerals 81 and 82, with clamping member 81 being disposed adjacent the upper mold section 12, while end member 82 is presented at the outermost projecting end of former 11. With regard to the structure of the member 81, it will be seen that the same includes concentric clamping rings 81a and 81b that coact together to clamp the bead portion 80a of former 80 therebetween, with these rings 81a and 81b being received around a ring member 81c that is, in turn, connected to the lower end of a tubular sleeve 84.

The just-described sleeve 84 is further shown provided with an enlarged radial lip 85 that slides in piston-like fashion against the internal wall 86a of a cylindrical member 86. In this fashion, the entry of pressurized medium through opening 86b will cause the annular rib 85 and sleeve 84 to move downwardly as a unit for projection beyond the mold 12, as clearly shown in FIGURE 6, for example. An enlarged boss 86c, provided on one axial end of the sleeve 86, permits the use of draw bolts 87, 87 for the purpose of suspending the sleeve 86 in concentric relationship with the cylindrical housing 12a as is clearly shown in the drawings, with draw bolts 87, 87 being secured at their opposed end to apertured cover plate 88. Additionally, the axial ends 86c and 86e of sleeve 86 are further provided with central bores that permit sliding movement of the sleeve 84 axially of the cylinder 86.

By like token, the lowermost clamping member 82 includes concentric clamping rings 82a and 82b that are respectively secured in known fashion about the lowermost end 90a of a cylindrical shaft 90; the arrangement being such that the shaft 90 is concentrically telescoped within the sleeve 84 as shown in the drawings, with the upper end 90b thereof receiving an enlarged piston member 94, against which pressurized force can be applied through pressure line 95, with this line 95 passing through an end plug 96 that closes off the extreme uppermost end 84c of sleeve 84, as shown in FIGURE 7, for example.

Referring now to FIGURE 3a, it will also be seen that the lowermost end 90c of shaft 90 is provided with a blind bore 100, within which is telescopically received an axially shiftable sleeve member 101. This sleeve member 101 is spring loaded with base 100 by use of spring 102, and in this fashion, the member 101 will be urged axially outwardly in bore 100, with limitation of such projection being effectuated by flange 101a and bushing 104. Openings 103, 103 are provided in the wall of the shaft 90 for purposes of admitting fluid to the interior of the former, and additionally, the member 101 is provided with an internal bore 101b, through which fluid can be admitted from the lower mold section 14, as will now be described.

In this regard and for the purpose of effectuating supply to the conduit 101, it will be seen that the bead ejector means 13 includes a web 110, through which a supply pipe 111 may be passed, with this supply pipe 111 leading to elbow 112 and fitting 113 so that fluid in line 111 may pass into a bore opening 115 that is provided in boss 116. Also in this regard, a contoured fitting 117 having a properly inclined tapered face 118, centers the end of the member 101 concentric to bore 115, and additionally, face 118 receives packing washer 119 that insures proper sealing at this point of juncture.

Figure 9:
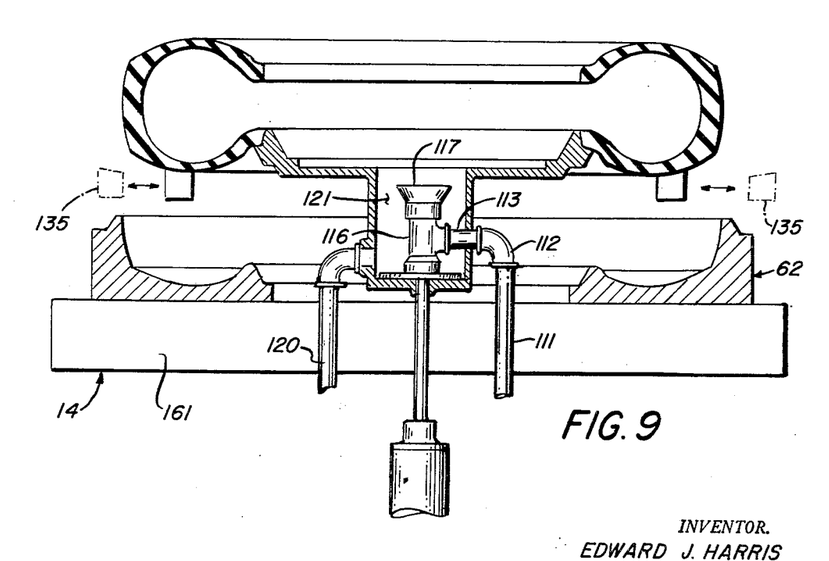

Also and as best shown in FIGURE 9, an exhaust line 120 leads into the cavity 121 that is defined by the bead ejector means 13; and in this regard, it is to be understood that the clamping ring 82a preferably includes a flange fitting 125 (see FIGURE 8) to which a flexible conduit 126, having a pickup head 127, can be secured as is clearly shown in the drawings.

Additionally and as shown in FIGURE 5, a chain 130 may be provided between the clamping rings 82a and 81b so as to limit the extent of axial separation between these members. The remaining structural distinctions of the press relate to the provision of roller members, indicated generally in FIGURE 9 by the numeral 135, with these roller members being schematically illustrated in FIGURE 9 as being slidable in the direction of the arrows so as to be positionable under the cured tire T, whereby the same can be stripped from the bead ejector mechanism, as shown in FIGURE 9.

While vulcanizing medium may be supplied interiorly of the former and withdrawn therefrom as has previously been described, the preferred embodiment of the invention also contemplates the provision of means for heating the conventional pot members 160 and 161 that serve as component parts of the upper and lower mold sections 12 and 14 respectively, with these pot members being associated with the design-imparting sections of the respective mold sections for the purpose of supplying additional heat so as to effectuate a curing of the tire from the outside in.

Accordingly, and referring to FIGURES 1 and 2, it will be seen that the upper pot member 160 includes opposed fittings 162 and 163, from which lead conduits or pipes 164 and 165, with the conduits 164 and 165 being disposed interiorly of the pins 49, 49 so as to project beyond the pin 49 and terminate in swivel type elbows 166 and 167 (see FIGURE 2). Leading from the elbow 167 is a pipe 169 which terminates in a swivel type connection 170, with line 171 in turn extending between swivel connection 170 and swivel elbow 172 that is secured to the supply line 173, with line 173 being fixed on plate 20 as shown best in FIGURE 1. In this manner, the component parts can move through the various positions shown in FIGURE 1, with vulcanizing steam, for example, being supplied from line 173 to pot 160 through the just described connections.

Similarly, by provision of an equivalent type of swivel piping arrangement terminating in member 166 and leading to exhaust line 167 through fitting 175, it is believed apparent that condensate can be exhausted from pot 160 by passing into the line 174 and causing the conduit to flow through such swivel piping arrangement. Additionally, and with regard to the supply and exhaust of medium to the lower pot 161, it is believed apparent that conventional piping could be employed in this regard, since there is no relative movement of this pot occurring, since the same is fixed between the plates 20, 20 as has previously been described.

*Operation of the Device*

In use or operation of the improved vulcanizing press, it will first be assumed that the component parts have been assembled into the operating condition shown in the drawings and further that the necessary steam and exhaust lines and motor connections have been made so that the device may be operative in the following fashion.

Accordingly and to this end, the improved vulcanizing press 10 will first be operated so that upper mold section 14 is moved to the dotted line position of FIGURE 1 of the drawings, wherein the link arm 45 thereof is extended to the uppermost vertical condition shown in FIGURE 1 of the drawings.

Figure 4:
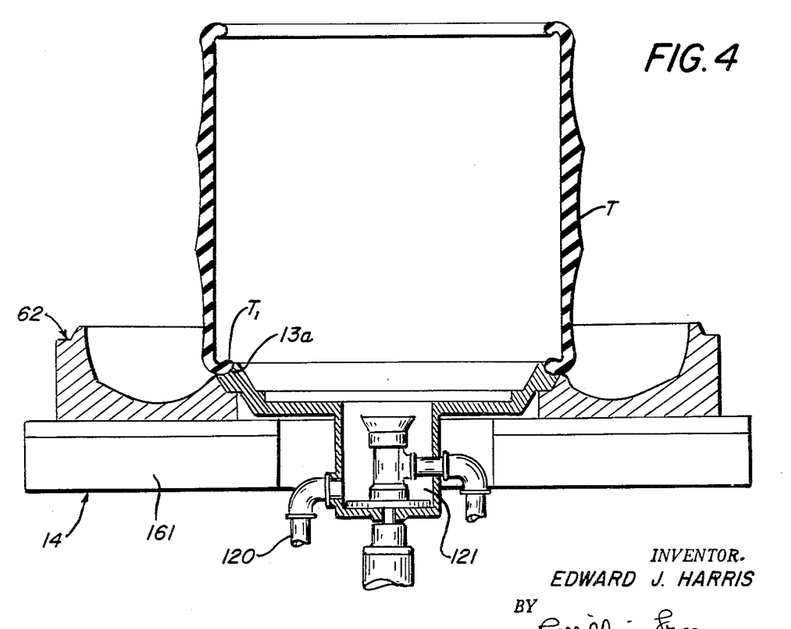
FIGURES 4 through 9 inclusive are schematic sectional views showing the position of the component parts in various stages of the operation.

At this time, the respective mold sections will be positioned approximately as shown in FIGURE 4 of the drawings, with the result that the tire T can have its lower bead portion T₁ positioned on the bead seat 13a of bead ejector 13. At this time, the former mechanism 11 will be axially withdrawn within the upper mold section 12; and upon positioning of the tire as described, the energized motor 25 may be operated to cause rotation of spur gears 27 and 28, which will in turn cause rotation of worm gear 30 to in turn rotate spur gears 37 and 38. With spur gear 38 rotating and being keyed to shaft 39, as has been previously described, it is believed apparent that the lower end of the link arm 45 will move in a clockwise direction (FIGURE 1) so as to cause a lowering of the upper mold section 12 to the chain dotted line position of FIGURE 3. Further rotational movement of motor 25 will cause the upper mold section 12 to move downwardly to the full line position of FIGURE 1, at which time the press sections 11 and 14 will be matched or mated, as is shown in FIGURE 1 of the drawings in full line.

Prior to this time, however, certain occurrences or movements of the former 11 with respect to the upper mold section 12 will occur; and, since these movements are best shown in FIGURES 4 through 7 of the drawings, attention is first directed to these figures.

Accordingly and as shown in FIGURE 4, the former mechanism 11 is completely withdrawn with respect to the mold section 12 and accordingly, the next step of operation after positioning of the tire T on ejector 13 as described, is to extend the former 11 to the axially extended condition of FIGURE 5, with such axial extension of the former being facilitated by the entry of pressurized fluid through line 95 to act against the piston 94 of shaft 90. Accordingly, in FIGURE 5, it will be seen that the piston 94 has been lowered relatively of sleeve 84 so that the lower clamping ring 82 has been extended to its condition of maximum projection with respect to upper mold section 14, with such axial projection preferably being limited by chain 130. It will additionally be noted that the clamping ring mechanism 81 will also have been moved during the change of position between FIGURES 4 and 5, with movement of the upper clamping ring assembly 81 being facilitated by the introduction of pressurized fluid through opening 86b (see FIGURE 7). Such fluid entering opening 86b will act against radial flange 85 and accordingly move the same, together with sleeve 84, relatively of sleeve 86 so as to unseat the clamping ring mechanism 82 with respect to a design-imparting cavity 61 of the upper mold section.

When the condition of FIGURE 5 has been reached, it is believed apparent that upon further closing movement of the press sections, the extreme projecting end of member 101 will be seated within the fitting 117 so that the condition of FIGURE 3a will be achieved. At this time, the projecting end of member 101 will be concentrically aligned with bore 115 so that the same can supply bore 101b. In this regard, it has been noted previously that the member 101 can slide relatively of the lowermost portion 90c of shaft 90 due to the use of the spring member 102; and accordingly, during closing movement to the position of FIGURE 6, it will be noted that an axial shifting of member 101 can occur with respect to shaft 90, so that even upon movement of shaft 90 relative of lower mold 14, there will be a spring load contact between members 101 and 117 to insure a proper fluid supply.

In this regard and assuming contact has been made between the member 101 and the fitting aperture 117, further closing movement between press sections will result in the clamping member 81 moving to the approximate position of FIGURE 6.

During the movement between the point of initial contact and the position of FIGURE 6, it is, of course, to be understood that pressurized fluid will be admitted to the interior of former 80 as a result of the pressurized fluid entering from line 11 and passing through conduits 115, 101b and 103. Accordingly, during movement to the position of FIGURE 6, there will be an increase in the radial pressure of expansion within the former 80 and this radial expansion, combined with the axial collapse thereof upon continued movement of ring assembly 81, will cause the tire T to be moved from the chain dotted line position of FIGURE 6 to the full line position thereof.

During this time, it is to be noted that the lower bead of the tire T will be permitted to have its lower bead portion $T_1$ moved off of bead seat 13a. This is possible because of the fact that there is a tendency for this unseating to occur due to the axial collapse of the tire that is necessarily caused by radial expansion thereof. In the instant case of FIGURE 6, it is to be noted that the shaft 90 can float with respect to member 101; and upon an examination of the full line position of FIGURE 6, it will be noted that the member 101 is still in contact with fitting 117 so that a continuing supply of pressurized fluid is provided within the former 80 notwithstanding the fact that the lower bead ring assembly 82 has moved from the seated position of FIGURE 3a to the unseated position shown in full line in FIGURE 6 of the drawings.

Thus, in this fashion, the tire is able to float on the expanding former with the result that air entrapment between former and tire will be obviated.

Upon further closing of the press members to the condition of FIGURE 3, the lower bead ring assembly 82 will be repositioned in seating relationship with ejector means 13 as shown in FIGURE 7 where the condition of full closure is illustrated.

Accordingly, in the condition of FIGURE 7, vulcanization can occur for the required period of time necessary to completely cure the tire. In this regard, it is to be noted that during such period the exhaust member 127 will pick up condensate occurring interiorly of former 80 and the same will be evacuated through line 126, fitting 125 and exhaust line 120.

When the curing cycle has been completed and it is desired to remove the cured tire T from press 10, the upper mold section 12 is first shifted relatively of tubular member 84 and shaft 90 and in this fashion, the upper half of the cured tire will be stripped from the design-imparting cavity 61. After certain amount of movement of the upper mold section 12 has occurred relatively of members 84 and 90, as just described, the members 12, 81 and 84 can be moved in unison relatively of the lower mold section 14 and shaft 90 to effectuate stripping of the bladder 80 from the interior of the cured tire T, with this condition being illustrated as occurring in FIGURE 8 of the drawings. In this regard, it is believed well understood that such shifting movement will be achieved when the flange 85 has moved through its limit of movement relatively of member 86 so that the member 85 will at this time come into contact with the lower axial end wall 86e with the result that movement of the upper mold section 12 thereafter will also result in movement of the member 82 relatively thereof.

Accordingly, upon further movement of the members 81 and 84 relatively of the shaft 90, it is believed that the limit of axial separation between these two members will be reached, with this condition preferably being achieved by the use of the chain member 130. Thus, upon further movement, the chain member 130 will cause the lower clamping member 82 and shaft 90 to move in unison with the upper end 81 so that the former 11 will now be axially extended so that the same can be withdrawn. In this regard, the condition of the former at this time is substantially the same as is shown in connection with FIGURE 5 of the drawings. Upon complete withdrawal, the former 11 may be collapsed to the position of FIGURE 4, and at this time the bead ejector means 13 may be operated to cause the tire T to be raised to the position of FIGURE 9, at which time loading rings 135, 135 may be moved from the chain dotted line position of FIGURE 9 to the full line position thereof, whereupon the tire T will be suspended on the members 135, 135 upon withdrawal of the bead ejector means. Upon removal of the tire T, the above cycle of events may be repeated for the purpose of effectuating vulcanization of another tire.

Figure 10:
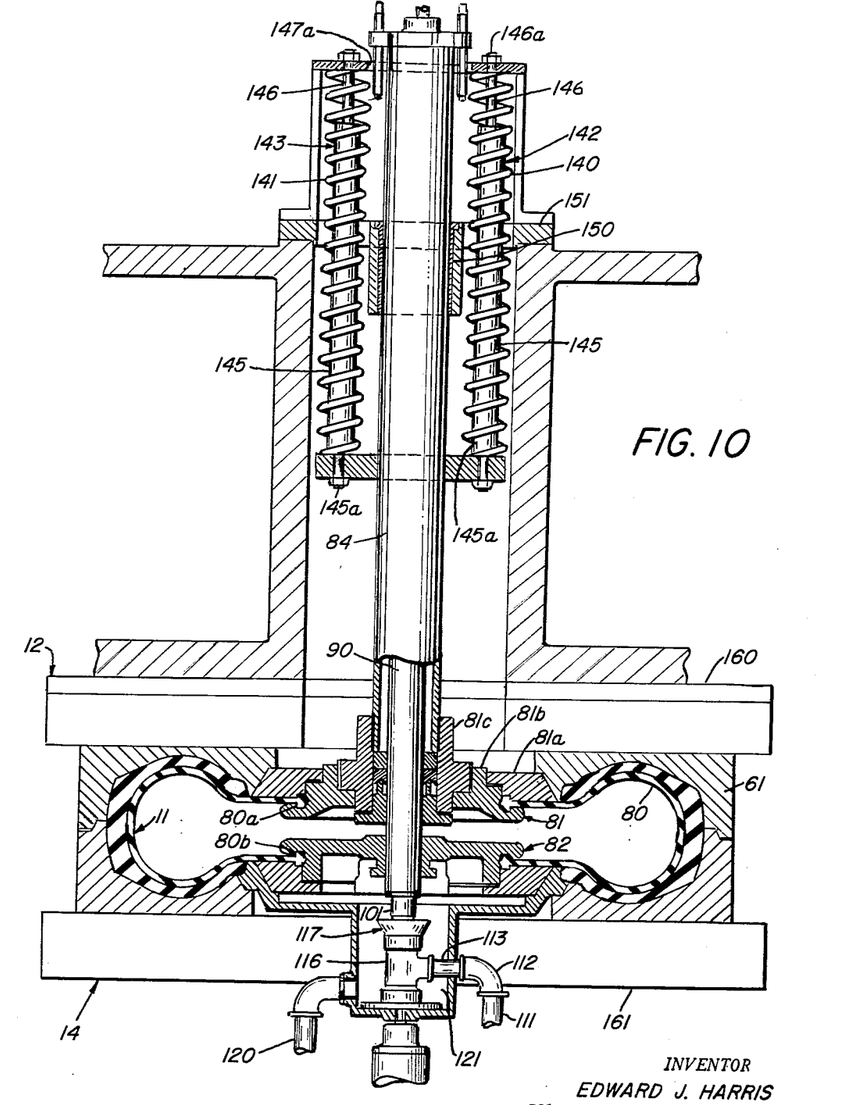
FIGURE 10 is a view corresponding to FIGURE 7 but illustrating a modified form of the invention.

In the modified form of the invention shown in FIGURE 10 of the drawings, the component parts are substantially the same except that spring members 140, 141 are provided around telescoped shaft assemblies 142 and 143 to thus effectuate relative movement between tubular member 84 and shaft 90 in a different manner.

Thus, in the modification of FIGURE 10, the member 84 has a circular flange 144 secured to a medial portion thereof, with this flange 144 receiving the lower ends 145a, 145a of cylindrical members 145, 145. Additionally, the cylindrical members 146, 146 are telescoped within each member 145 with the free end 146a thereof being secured to a flange 147 that is fixed with respect to the upper mold section 12. In this fashion, the spring members 140, 140 will, in each case, urge the member 144 away from the plate 147 so that, in all cases, the sleeve 84 will be urged outwardly from the mold section 11 so as to normally cause the ring assembly 81 to be in the position similar to that shown in FIGURES 5 and 6. In this regard, however, when the end 101 contacts the fitting 117 as shown, for example, in FIGURE 3, it is believed apparent that the closing force of the press will be transferred to the member 84 to cause the same to have flange portion 144 moved towards the flange 147, with the force of springs 140 and 141 being overcome in this regard.

In the remaining aspects of the operation, the modified form of the invention operates as previously described, and it will be noted that a bearing 150 is provided on web member 151 for the purpose of guiding the member 84 during its movement relatively of upper mold section 12. It is also believed apparent that an appropriate bore 147a is provided in the member 147 for clearance purposes and accordingly, it is believed apparent that the operation of the device will be the same as before, with the exception that the upper ring assembly 81 will normally be projected from the upper mold section 14 by springs 140, 141.

Referring now to FIGURE 11 of the drawings, it will be seen that the modification disclosed herein relates primarily to a method of varying the spacing between the axial ends of 81 and 82 of the pneumatic former 11, with such adjustment in axial spacing being desirable to accommodate different sizes of pneumatic formers that would necessarily be employed in connection with the vulcanization of different sized pneumatic tires. Accordingly, in this regard, it is to be understood that the axial end 82 is secured around member 84 as has been previously described, with the overall axial end 81 being adjustably secured to the lower end of the sleeve 86, as will now be described.

Accordingly and to this end, a collar 180 is shown threaded within an undercut 85f of sleeve 86, with the collar 180 including an externally threaded surface 181, upon which may be received a spacer ring 182 and a telescoped sleeve 183. The remaining components of assembly in this regard are conventional as before, with the various components of member 81 being threaded or otherwise received together so as to move as a unit relatively of member 84, with the improvement of this modification relating to the provision of ring 182, which operates to determine the extent of axial telescoping of member 183 over member 180. In this fashion and upon removal of the member 182, for example, the member 81 can be positioned at a greater axial distance from the member 82 and, conversely, upon the substitution of a member 182 of greater thickness, the axial distance between the members 81 and 82 can be decreased.

Figure 12:
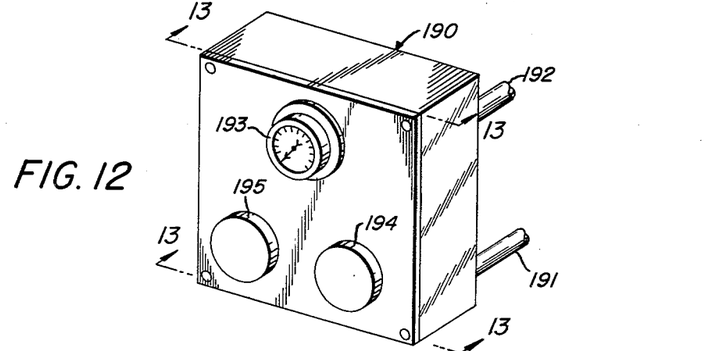
FIGURE 12 is a perspective view of shaping controls designed for use with the press of this invention.
Figure 13:
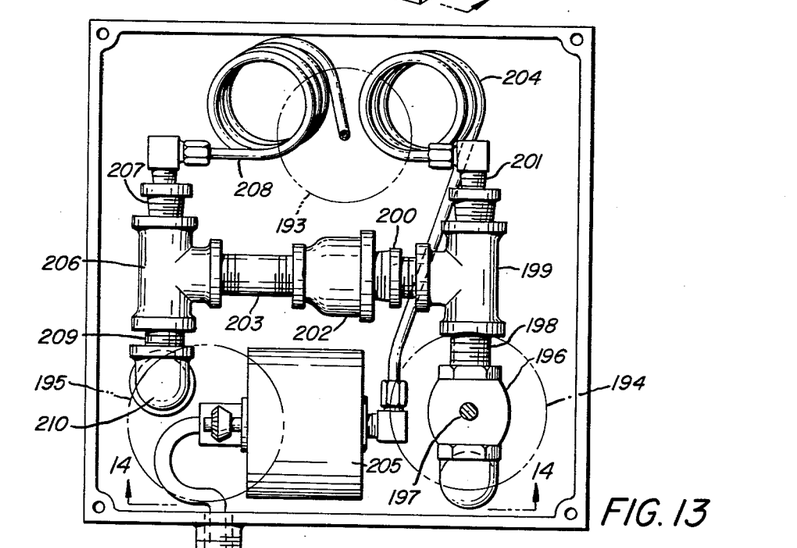
FIGURE 13 is a vertical section taken on the line 13, 13 of FIGURE 12.
Figure 14:
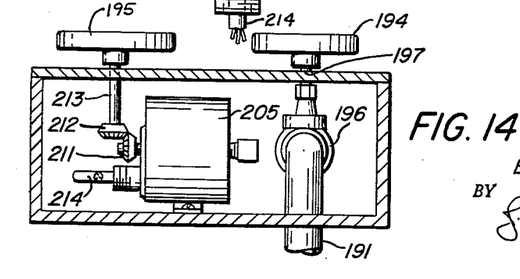
FIGURE 14 is a horizontal section taken on the lines 14, 14 of FIGURE 13.

The modified form of the invention shown in FIGURES 12 through 14 has reference to control means having particular utility in connection with respect to the vulcanizing press previously described; and accordingly, it is to be understood that the same operates in cooperation with the improved press but is not limited to installation or use on the specific press herein described.

Accordingly, and referring to FIGURE 12, the shaping control mechanism, generally designated by the numeral 190, is shown including supply and exhaust lines 191 and 192, with these lines being interposed across the supply line 111 before its point of connection with the projecting end of the former mechanism 11. Additionally, a pressure guage 193, as well as control handles 194 and 195 are provided, with valve handle 194 controlling the pressure emitting through line 192, while valve 195 serves to operate certain releasing mechanism upon the attainment of a preselected pressure.

Accordingly, and referring to FIGURE 13, it will be seen that steam entering through line 191 passes into a pressure regulating valve 196 that has a stem 197 leading to handle 194, with rotation of handle 194 serving to control the pressure of medium entering line 198 in known fashion. Medium from line 198 is then diverted by T-valve 199 into lines 200 and 201, with valve 202 preventing back flow of the medium subsequently entering into conduit 203, while line 201 terminates in a tubular conduit 204 that leads to a pressure sensitive control switch 205. In this manner, the pressure of medium in lines 204 and 203 will at all times be equal and it will be seen that T-fitting 206 in turn has one branch 207 that leads through conduit 208 to the pressure guage 193, while the other leg 209 thereof leads through elbow 210, into exhaust line 192. Additionally, the pressure regulator 205 has a bevel gear 211 that meshes with a bevel gear 212 attached to the shaft 213 of handle 195, with rotation of gear 211 varying the pressure at which switch 205 will trip or operate to send an electrical impulse through wires 214 to a relay switch (not shown) that serves to control the closing of the press, with the relay first de-energizing the motor closing the press and subsequently re-energizing the same upon tripping of switch 205. If desired, a cycling instrument may be interposed in line 214 to progressively advance the mold towards closing in stages that are tuned to the shaping operation.

In this regard, it is to be understood that the relay switch employed is of the type wherein the same will stop the closing movement of the upper mold section 12 upon being de-energized by the same during closing. The resumption of closing movement of mold section 12 can then be resumed only upon the attainment of certain pressure in pressure switch 205 and it is to be understood that the regulation of handle 195 will accordingly determine the recommencement of the closing cycle.

In use or operation of the improved control means 190, the operator will first set the handle 194 to the position where the required pressure will be supplied through line 192 to the interior of former 12 and upon setting of the handle 194 in this manner, the closing operation of the press will not be finalized until the internal pressure within the former 80 has reached the setting indicated by the handle 194. Accordingly and assuming the handle 194 to have been set to indicate a pressure of 50 pounds, the line pressure in line 192 will be built up until such time as the pressure within exhaust line 192 reaches 50 pounds and upon the reaching of this pressure, the pressure switch 205 will be operated to de-energize the solenoid and accordingly, re-energize the closing circuit to continue closing movement of the upper mold section 11.

From an operational standpoint, the operator merely need determine the setting once, after which the cycle will become automatic.

In curing a tire, it will be assumed that the internal pressure to be obtained is 50 pounds; and accordingly, after positioning the tire in place as has been previously described, the operator will initiate closing movement of the upper mold section 12. When the upper mold section reaches a point approximately even with the upper bead of the tire (which occurs after the projecting end of the former has been engaged with supply line 11) the relay switch (not shown) will be de-energized to stop closing movement of the former 12. At this time, medium from line 111 will be entering the interior of the former through shaping control means 190; and accordingly, this medium will enter through line 191 and pass through valve 196 to be regulated to the proper pressure, with the pressure in line 192 being indicated at all times by the pressure guage 193. When the pressure has reached the desired point, the operator merely needs to rotate the handle 195 until the gear 212 rotates gear 211 of pressure switch 205 to the point where the same will trip and energize lines 214, and at this point, the relay switch will be energized to permit resumption of closing movement of mold section 12.

In this manner, and by ascertaining the amount of internal pressure, a preshaping of the former can occur, with the result that the tire can adjust itself on the former prior to the closing of the press, with the result that steam escapement or other air entrapment between former and tire is accordingly obviated.

In repetitive curing of the same size tires, it is believed apparent that no further setting will be necessary, since switch 205, having been set to trip at a certain pressure, will not trip until this pressure is reached and accordingly, in each successive operation, there will be a stopping of the press followed by inflating of the former to a certain preselected internal pressure. When this internal pressure is reached, the switch 205 will be actuated to permit closing of the press, followed by vulcanization or curing as has previously been described.

It is also to be understood that the invention herein disclosed contemplates the use of superheated steam as a curing medium for the purpose of effectuating curing with a high temperature in the absence of the high pressure that would otherwise be required should ordinary steam be employed. Accordingly, superheating means may either (1) be employed to heat the steam (2) be attached to the press itself or (3) be disposed adjacent the press, with representative means for this purpose being shown in applicant's copending application Serial No. 673,081, filed July 19, 1957 and now U.S. Patent 2,970,342.

While a full and complete disclosure of the invention has been set forth in accordance with the dictates of the Patent Statutes, it is to be understood that the invention is not intended to be so limited. Accordingly, where appropriate further modifications of the invention may be resorted to without departing from the spirit hereof or the scope of the appended claims.

This application is a continuation in part of applicant's copending applications Serial No. 690,675, filed October 17, 1957, and now Patent 2,970,342 granted Feb. 7, 1962 and Serial No. 673,081, filed July 19, 1957.

What is claimed is:

1. A vulcanizing press of the character described, comprising; a first mold section; a second mold section; means for moving said mold sections relatively of each other between open and closed position with said mold sections defining an annular tire curing cavity when positioned in said closed position; former supporting means shiftably carried by said first mold section and projecting axially thereof; a pneumatic former having axial ends that are carried by said former supporting means with said former projecting axially of said first mold section towards said second mold section; fluid supply means carried by said second mold section and including a discharge opening; connecting means carried by the projecting end of said former in axially shiftable relationship therewith and being engageable with said discharge opening during closure of said press; control means interrupting closing movement of said press following engagement between said connecting means and said discharge opening; means supplying inflating pressure to said former during the period when said press closure is interrupted and further supplying vulcanizing fluid to the interior of said former when said press is closed; and means for retaining said connecting means in engagement with said discharge opening during initial separation between said second mold section and the projecting end of said former.

2. A vulcanizing press of the character described, comprising; a first mold section; a second mold section; means for moving said mold sections relatively of each other between open and closed position with said mold sections defining an annular tire curing cavity when positioned in said closed position; former supporting means shiftably carried by said first mold section and projecting axially thereof; a pneumatic former having axial ends that are carried by said former supporting means with said former projecting axially of said first mold section towards said second mold section; fluid supply means carried by said second mold section and including a discharge opening; connecting means carried by the projecting end of said former in axially shiftable relationship therewith and being engageable with said discharge opening during closure of said press; control means interrupting closing movement of said press following engagement between said connecting means and said discharge opening; means supplying inflating pressure to said former during the period when said press closure is interrupted and further supplying vulcanizing fluid to the interior of said former when said press is closed; said connecting means being normally urged to a condition of maximum projection axially beyond the projecting end of said former, whereby the same will remain in engagement with said discharge opening during initial limited separation between the projecting end of said former and said second mold section.

3. The device of claim 2 further characterized by the fact that said connecting means are spring loaded to said condition of maximum projection beyond said former.

4. A vulcanizing press of the character described, comprising: a first mold section; a second mold section; means for moving said mold sections relatively of each other between open and closed position with said mold sections defining an annular tire curing cavity when positioned in said closed position; former supporting means shiftably carried by said first mold section and projecting axially thereof and including a tubular housing opening inwardly from the projecting end thereof; a pneumatic former having axial ends that are carried by said former supporting means with said former projecting axially of said first mold section towards said second mold section; fluid supply means carried by said second mold section and including a discharge opening; a tubular connecting pipe telescoped within said tubular housing and being urged to a condition of maximum projection therebeyond for reception in said discharge opening during closure of said press, control means interrupting closing movement of said press following engagement between said connecting means and said discharge opening; means supplying inflating pressure to said former during said period when said press closure is interrupted and further supplying vulcanizing fluid to the interior of said former when said press is closed; and retaining means for retaining engagement between said discharge opening and said connecting pipes during initial separation between said second mold section and the projecting end of said former.

5. A vulcanizing press of the character described, comprising; a first mold section; a second mold section; means for moving said mold sections relatively of each other between open and closed position with said mold sections defining an annular tire curing cavity when positioned in said closed position; former supporting means shiftably carried by said first mold section and projecting axially thereof; a pneumatic former having axial ends that are carried by said former supporting means with said former projecting axially of said first mold section towards said second mold section; fluid supply means carried by said second mold section and including a discharge opening; connecting means carried by the projecting end of said former in axially shiftable relationship therewith and being engageable with said discharge opening during closure of said press; control means interrupting closing movement of said press following engagement between said connecting means and said discharge opening; means supplying inflating pressure to said former during the period when said press closure is interrupted and further supplying vulcanizing fluid to the interior of said former when said press is closed; said inflation of said former occurring prior to seating of said projecting former and with respect to said second mold section whereby a tire received on said former during said inflation thereof may shift relatively of said former.

6. A vulcanizing press of the character described, comprising; a first mold section; a second mold section; means for moving said mold sections relatively of each other between open and closed position with said mold sections defining an annular tire curing cavity when positioned in said closed position; former supporting means shiftably carried by said first mold section and projecting axially thereof; a pneumatic former having axial ends that are carried by said former supporting means with said former projecting axially of said first mold section towards said second mold section; fluid supply means carried by said second mold section and including a discharge opening; connecting means carried by the projecting end of said former in axially shiftable relationship therewith and being engageable with said discharge opening during closure of said press; control means interrupting closing movement of said press following engagement between said connecting means and said discharge opening; means supplying inflating pressure to said former during the period when said press closure is interrupted and further supplying vulcanizing fluid to the interior of said former when said press is closed; a tire suspended on said former having its bead portions out of contact with both said mold sections during the period fluid is being supplied to the interior of said former.

7. A vulcanizing press of the character described, comprising; a pair of complemental, relatively movable first and second mold sections moving between open and closed positions and defining an annular tire curing chamber when closed; tire supporting means carried by said second mold sections and adapted to receive an uncured tire; former supporting means shiftably carried by said first mold section; a pneumatic former carried by said former supporting means in projecting relationship to said first mold section; connecting means carried by the projecting end of said former; supply means carried by said second mold section and being engaged by said connecting means during press closing, whereby inflating pressure can be supplied to the interior of said former following engagement between said connecting means and said supply means; means for interrupting closing movement of said press following engagement between said connecting means and said supply means; means for inflating said former to a predetermined pressure while press closure as interrupted said uncured tire being transferred from support position on said tire supporting means to supported position on said former following engagement between said connecting means and said supply means and prior to movement of said mold sections to fully closed positions.

8. A vulcanizing press of the character described, comprising; a pair of complemental, relatively movable first and second mold sections moving between open and closed positions and defining an annular tire curing chamber when closed; tire supporting means carried by said second mold section and adapted to receive an uncured tire; former supporting means shiftably carried by said first mold section; a pneumatic former carried by said former supporting means in projecting relationship to said first mold section; connecting means carried by the projecting end of said former; supply means carried by said second mold section and being engaged by said connecting means during press closing, whereby inflating pressure can be supplied to the interior of said former following engagement between said connecting means and said supply means; means for interrupting closing movement of said press following engagement between said connecting means and said supply means; means for inflating said former to a predetermined pressure while press closure is interrupted; and pressure controlled means actuating resumption of closing movement of said press in response to attainment of said predetermined pressure in said former.

9. The device of claim 8 further characterized by the presence of means that transfer said uncured tire from said tire supporting means to said former during inflation of said former during the period that press closure is interrupted.

10. The device of claim 8 further characterized by the fact that said pressure controlled means are variable with respect to the pressure required to actuate the same.

References Cited in the file of this patent
UNITED STATES PATENTS

| | | |
|---|---|---|
| 1,755,048 | Brice | Apr. 15, 1930 |
| 2,435,466 | Thomas | Feb. 3, 1948 |
| 2,561,169 | Bickelhaupt | July 17, 1951 |
| 2,670,499 | Weigold et al. | Mar. 2, 1954 |
| 2,736,059 | Frank | Feb. 28, 1956 |
| 2,741,799 | Heston | Apr. 17, 1956 |
| 2,775,789 | Soderquist | Jan. 1, 1957 |
| 2,970,342 | Frohlich et al. | Feb. 7, 1961 |